(12) United States Patent
Bauer et al.

(10) Patent No.: US 9,392,048 B2
(45) Date of Patent: Jul. 12, 2016

(54) METHOD, A SYSTEM, A SERVER, A DEVICE, A COMPUTER PROGRAM AND A COMPUTER PROGRAM PRODUCT FOR TRANSMITTING DATA IN A COMPUTER NETWORK

(75) Inventors: Markus Bauer, Pegnitz (DE); Marcus Kessler, Esslingen am Neckar (DE); Karsten Oberle, Mannheim (DE); Jurgen Sienel, Leonberg (DE)

(73) Assignee: Alcatel Lucent, Boulogne-Billancourt (FR)

( * ) Notice: Subject to any disclaimer, the term of this patent is extended or adjusted under 35 U.S.C. 154(b) by 256 days.

(21) Appl. No.: 13/806,217

(22) PCT Filed: May 6, 2011

(86) PCT No.: PCT/EP2011/057272
§ 371 (c)(1),
(2), (4) Date: Dec. 21, 2012

(87) PCT Pub. No.: WO2011/160884
PCT Pub. Date: Dec. 29, 2011

(65) Prior Publication Data
US 2013/0232224 A1    Sep. 5, 2013

(30) Foreign Application Priority Data

Jun. 24, 2010    (EP) .................................... 10305678

(51) Int. Cl.
*H04L 29/08* (2006.01)
*G06F 9/54* (2006.01)

(52) U.S. Cl.
CPC .  *H04L 67/10* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 5,951,694 A | 9/1999 | Choquier et al. | |
| 6,539,415 B1* | 3/2003 | Mercs | G06F 9/5044 718/104 |
| 2002/0099829 A1* | 7/2002 | Richards | G06F 17/30899 709/227 |
| 2003/0069975 A1* | 4/2003 | Abjanic | H04L 63/0428 709/227 |
| 2004/0012808 A1* | 1/2004 | Payne et al. | 358/1.15 |
| 2004/0087326 A1 | 5/2004 | Dunko et al. | |
| 2004/0193648 A1* | 9/2004 | Lai | H04N 7/17318 |

(Continued)

FOREIGN PATENT DOCUMENTS

| | | |
|---|---|---|
| CN | 1695387 A | 11/2005 |
| CN | 1870494 A | 11/2006 |

(Continued)

OTHER PUBLICATIONS

English Bibliography for Chinese Patent Application Publication No. CN1695387A, published Nov. 9, 2005, printed from Thomson Innovation on Sep. 23, 2015, 4 pp.

(Continued)

*Primary Examiner* — Philip Chea
*Assistant Examiner* — Wuji Chen
(74) *Attorney, Agent, or Firm* — Fay Sharpe, LLP

(57) ABSTRACT

The invention concerns a method for transmitting data via a data link in a computer network, wherein a device at an endpoint of a section of said data link is selected (203) from devices of said computer network, a computer program adapted to process said data, is transferred (204) to said device and said data is processed (206) by said device by executing said computer program.

20 Claims, 4 Drawing Sheets

(56) References Cited

U.S. PATENT DOCUMENTS

| | | | |
|---|---|---|---|
| 2004/0203616 A1 | | 10/2004 | Minear et al. |
| 2006/0020847 A1* | | 1/2006 | Oberle .................... H04M 3/42 |
| | | | 714/4.1 |
| 2006/0106774 A1* | | 5/2006 | Cohen ..................... G06Q 30/06 |
| 2006/0268712 A1 | | 11/2006 | Deen et al. |
| 2006/0269058 A1* | | 11/2006 | Kessler ............... H04L 63/0442 |
| | | | 380/232 |
| 2007/0118617 A1 | | 5/2007 | Lee et al. |
| 2007/0226546 A1* | | 9/2007 | Asthana et al. ................. 714/47 |
| 2008/0133655 A1 | | 6/2008 | Watada et al. |
| 2008/0144498 A1* | | 6/2008 | Chung .................... H04L 47/10 |
| | | | 370/231 |
| 2010/0064285 A1* | | 3/2010 | Dechovich et al. ........... 717/173 |
| 2010/0077008 A1* | | 3/2010 | Davis et al. ................... 707/797 |
| 2010/0211691 A1* | | 8/2010 | Jalkanen ............... H04L 65/104 |
| | | | 709/232 |
| 2012/0078837 A1* | | 3/2012 | Bagchi et al. .................... 706/52 |
| 2013/0007527 A1* | | 1/2013 | Petukhov et al. ............... 714/37 |

FOREIGN PATENT DOCUMENTS

| | | |
|---|---|---|
| CN | 100421385 C | 9/2008 |
| EP | 1 619 904 A1 | 1/2006 |
| EP | 1 727 328 A1 | 11/2006 |
| JP | 2002232863 A | 8/2002 |
| RU | 2335093 C2 | 9/2008 |
| RU | 2390963 C2 | 5/2010 |
| TW | 200826586 A | 6/2008 |

OTHER PUBLICATIONS

English Bibliography for Chinese Patent Application Publication No. CN1870494A, published Nov. 29, 2006, printed from Thomson Innovation on Sep. 23, 2015, 3 pp.

English Bibliography for Japanese Patent Application Publication No. JP2002232863A, published Aug. 16, 2002 printed from Thomson Innovation on Sep. 23, 2015, 3 pp.

English Bibliography for Taiwanese Patent Application Publication No. TW200826586, published Jun. 16, 2008, printed from Thomson Innovation on Sep. 23, 2015, 3 pp.

International Search Report for PCT/EP2011/057272 dated Jun. 15, 2011.

English Bibliography for Russian Patent Application Publication No. RU2335093C2, published Sep. 27, 2008, printed from Thomson Innovation on Jul. 13, 2015, 5 pp.

English Bibliography for Russian Patent Application Publication No. RU2390963C2, published May 27, 2010, printed from Thomson Innovation on Jul. 13, 2015, 4 pp.

English Bibliography for Chinese Patent Application Publication No. 1725710A, published Jan. 25, 2006, printed from Thomson Innovation on Feb. 9, 2015, 3 pp.

European Pat. App. No. 10305678.4, Extended European Search Report mailed Mar. 7, 2011, 6 pp.

PCT Pat. App. No. PCT/EP2011/057272, Written Opinion of the International Searching Authority, mailed Jun. 15, 2011, 4 pp.

English Bibliography for Chinese Patent No. 100421385C, published Sep. 24, 2008, printed from Thomson Innovation on Feb. 20, 2015, 3 pp.

* cited by examiner

100

METHOD, A SYSTEM, A SERVER, A DEVICE, A COMPUTER PROGRAM AND A COMPUTER PROGRAM PRODUCT FOR TRANSMITTING DATA IN A COMPUTER NETWORK

FIELD OF THE INVENTION

The invention relates to a method, a system, a server, a device, a computer program and a computer program product for transmitting data in a computer network.

BACKGROUND

In existing computer networks, like the well known Advanced Research Projects Agency Network (ARPANET), an operator decides which application to run on which component of the computer network. Typically entire applications are placed on one server or in one data center.

Alternatively parts of applications may be run on different processors in multi core systems. In this case a measurement and control application decides which part of which application shall run on which processor.

Applications consist of computer programs that are executed on a computer. Said computer programs are for example stored on a storage on said computer.

Alternatively applications may consist of multiple computer programs that interact with each other to perform the task of the respective application. Said multiple computer programs may be stored on multiple non-volatile storages, e.g. on clients or on servers that are part of a computer network.

In the case of distributed storage locations for computer programs that belong to a single application, two scenarios are currently known:

In a first scenario a client computer receives said computer programs resembling a part of said application or said application entirely from one or several servers in said computer network and executes them. In this scenario said part of said application can only be executed on said client computer, if the formats of said computer programs that are received by said client computer are recognized by said client computer. To that end said client computer for example comprises a table of recognized or allowed computer programs and refuses to execute computer programs that are not listed in said table.

In a second scenario, a first part of said application, e.g. a first computer program, is stored on said client computer and executed by said client computer. One or more further parts of said application, e.g. one or several second computer programs, are executed on one or several servers upon a request from said client computer. For example one or several computer programs that are stored on said one or several servers are executed on the server that stores them. Interaction of the different parts of said application requires data transfer. Data transfer is only possible if said data format of the transferred data is known by the respective applications or parts of said application. To that end applications or parts of said application for example comprise a table of recognized or allowed formats of data and refuse to process data that is not listed in said table.

Additionally to the computer programs also the data that is processed by the computer programs may be stored in a single storage or on several storages in the computer network. In this case the data is handled similarly to the scenarios described above.

In any case the storage locations for the parts of the application, i.e. the computer programs, and the data that is processed by the application as well as the data formats for transfer and storage have to be known in advance by all applications or parts of the application, e.g. statically, or communicated between said applications or parts of said applications, dynamically.

To overcome restrictions imposed by potentially unknown formats, typically applications or parts of applications either comprise support for as many different formats as possible or only support a very limited number of formats.

In current computer networks neither the storage location nor the data formats can be adjusted to the network environment, e.g. available bandwidth or computing capacity, in real-time. This limits the flexibility of current computer networks.

SUMMARY

The object of the invention is thus to increase flexibility of computer networks with respect to data flow.

Data flow in this context means that data is transmitted in said computer network.

The main idea of the invention is to transmit data via a data link in a computer network, wherein a device at an endpoint of a section of said data link is selected from devices of said computer network, a computer program adapted to process said data, in particular to send said data in a predetermined data format, is transferred to said device and said data is processed by said device, in particular sent in said predetermined data format, by executing said computer program. This way an application, i.e. the computer program, is moved to the device most suitable for processing said data in said computer network instead of sending said data to said application.

Advantageously a data format for transmitting said data via said section is selected, in particular by a server, from predetermined data formats depending on information about said computer network, in particular available computing cycles per second of said devices, bandwidth of the data links, latency or cost, said computer program is adapted to send said data in said data format, and said data is sent in said data format by executing said computer program on said device. This way the most suitable data format for transmitting said data is used and the computer program that creates said data format is moved to the most suitable location in the computer network. This means that said processing of said data is distributed throughout said computer network based on management said data flow in said computer network.

Advantageously said computer program is selected from predetermined computer programs, in particular by a server, depending on information about said computer network, in particular available computing cycles per second of said devices, bandwidth of the data links, latency or cost. This way the most suitable computer program is selected.

Advantageously said device is selected, in particular by a server, depending on information about said computer network, in particular available computing cycles per second of said devices, bandwidth of the data links, latency or cost. This way the most suitable device is selected.

Advantageously if a predetermined condition is fulfilled, said computer program is transferred to said device, in particular from a storage, execution of said computer program is started on said device, in particular upon completion of said transfer, said data is determined by said computer program, and said data is sent from said device.

Advantageously said data is transmitted to said device in a predetermined first data format, said data is transmitted from said device in a predetermined second data format, and said computer program is adapted to receive said data in said predetermined first data format and to determine said data in said predetermined second data format. This way the data format is changed according to the computer network status flexibly.

Advantageously said device or said computer program are selected depending on information about said data. This way the device or computer program most suitable for processing or transmitting said data is selected.

Further developments of the invention can be gathered from dependent claims and the following description.

BRIEF DESCRIPTION OF THE FIGURES

In the following the invention will be explained further making reference to the attached drawings.

DESCRIPTION OF THE EMBODIMENTS

Goal of the examples below is to increase the flexibility of a computer network with respect to data flow.

In said examples transmission of a data stream in a wide area computer network is described. Although said examples focus on said wide area computer network and said data stream, the invention may also be applied to any other type of data or computer network.

Transmission of data or transmitting data for example means any form of electronically sending and receiving said data.

A computer in said wide area computer network comprises for example a processor, a non-volatile storage, a volatile storage, a network interface and a data bus connecting the aforementioned parts of said computer. Said computer additionally comprises an operating system stored on said non-volatile storage.

A data stream is a continuous sequence of digitally encoded signals of a defined data format generated at one or multiple sources and distributed to one or more recipients that consume or process data contained in said data stream. For example said data stream comprises a sequence of data sets that are sent by said one or multiple sources. Said data stream may comprise of data sets of any data format.

Data flow means that said data, or said data stream is transmitted from said one or more sources to said one or more recipients via one or more data link.

A data set of said sequence of data sets is an atomic item of data according to a data format that allows a processing unit, e.g. said processor of said computer, to perform useful operation.

Said data sets are for example bit sequences that are structured according to a predetermined data format. Said data format for example describes the position and length of a header and of payload data within said data sets. Said header for example contains information about said one or more recipients, the position of said data set in said data stream or the position and length of said payload data section. Said data sets may be of fixed or flexible length.

Figure 1:
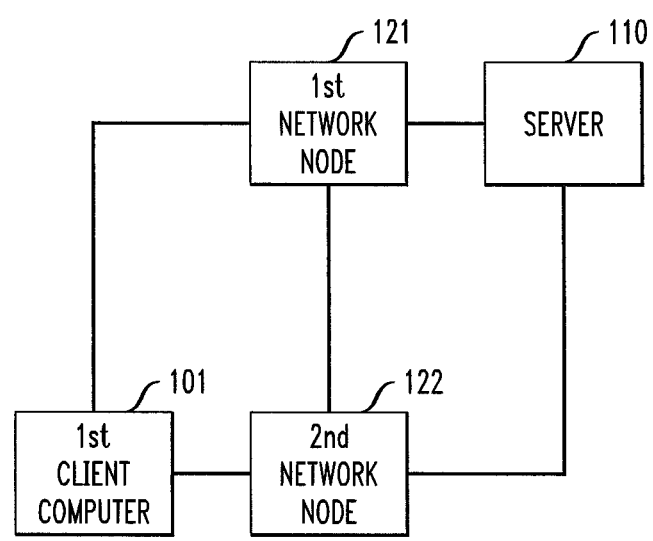
FIG. 1 schematically shows a first part of a computer network.

A first example using a single source, e.g. a server 110 and a single receiver, e.g. a first client computer 101, is described below referencing FIG. 1. FIG. 1 shows a first part of said wide area computer network 100.

Said first client computer 101 is for example a computer with a display.

Said first part of said wide area computer network 100 comprises said first client computer 101, a first network node 121, a second network node 122 and said server 110.

Said client computer 101 and said server 110 are connected via a first data link. Said first data link comprises of sections. Endpoints of said sections are devices, e.g. said server 110, said first client computer 101, said first network node 121 or said second network node 122. Said sections of said first data link are connections between said devices, for example optical fibres, wireless links or copper wires including the respective electronic circuitry for operating them. Said data is transmitted via said first data link using transmission protocols, e.g. the well known Transmission Control Protocol/Internet Protocol (TCP/IP). Any other type of wired or wireless data links, e.g. according to the User Datagram Protocol (UDP), the Ethernet or IEEE 802.11 standard, may be used as well.

Said first network node 121, said second network node 122, said server 110 or said first client computer 101 may be connected to each other directly or indirectly.

According to said first example, in order to send said data stream, said data sets are sent from said server 110 to said first client computer 101. To that end said header for example contains an Internet Protocol address of said first client computer 101.

Said server 110 is for example a digital video camera for capturing said payload data, comprising a microprocessor and a network interface adapted to send said data sets via said wide area computer network 100 to said first client computer 101 using said Internet Protocol address.

Said server 110 may also comprise a storage and be adapted to read said payload data from said storage.

Said server 110 is adapted to execute a first application, e.g. a first computer program. For example said microprocessor in said digital video camera is adapted to execute said first computer program.

Said first computer program when executed sends said data stream, i.e. said sequence of said data sets, in a predetermined first data format.

The content of said data stream is for example (raw) video data, e.g. in the Digital Video format (well known as DV). The Digital Video format employs a loss-tolerant video compression in real-time, while a video is recorded by said digital video camera. Said predetermined first data format of said data stream is for example defined to contain as payload data a first single picture (frame) of said video in Digital Video format in each data set.

Said data sets may be split up into multiple data packets according to said Transmission Control Protocol/Internet protocol (TCP/IP) or said User Datagram Protocol (UDP) which are then sent via said first network node 121 or said second network node 122 to said first client computer 101. In this case said first client computer 101 is adapted to receive said multiple data packets and join said multiple data packets to recreate said data sets from said multiple data packets according to said Transmission Control Protocol/Internet protocol (TCP/IP) or said User Datagram Protocol (UDP).

Said first client computer 101 is adapted to execute a second application, e.g. a second computer program. For example said processor in said client computer 101 is adapted to execute said second computer program.

Said second computer program when executed processes said data stream, i.e. said sequence of said data sets, in a predetermined second data format. Said second data format is for example a MPEG-4 video provided in an mp4 container according to ISO/IEC 14496-12 and -14, referred to as mp4 format below.

Said second computer program when executed for example receives one of said data sets in said predetermined second data format, determines a second single picture (frame) depending on said payload data of one or more of said data sets and displays said picture on said display.

Said Digital Video data format is memory-intensive. Therefore a digital video, or more general any data intense, data stream requires a lot of bandwidth (i.e. transport resources) and processing resources throughout said wide area computer network 100.

To reduce the amount of data that is required to transmit, and hence reduce bandwidth used, said video may be transmitted in a more compressed data format. For example payload data in said Digital Video format may be compressed using a third application, e.g. a third computer program.

Said third computer program is for example a coder or any computer program that reduces the amount of payload data. Said third computer program is for example a mp4 coder for determining a MPEG-4 video provided in a mp4 container according to ISO/IEC 14496-12 and -14, i.e. said mp4 format, for example from an input in said Digital Video format.

The purpose of said third computer program is to provide a transformation of said data set available at said server 110 in said predetermined first data format to said predetermined second data format requested by said first client computer 101.

Other examples of such transformation are data encoders, object recognizers, (audio) filters, data converters, storage, etc, or any combination of the above.

Said applications or computer programs are for example represented and stored in any type of instruction set that said devices, e.g. said server 110, said first client computer 101, said second client computer 102, said first network node 121 or said second network node 122 can read or execute. Said applications or computer programs are for example stored as machine code, binary code, assembler code or byte code.

Said first network node 121 or said second network node 122 are for example gateways in said wide area computer network 100.

Said first network node 121 or said second network node 122 is adapted to execute said third application, e.g. said third computer program. For example a microprocessor in said network nodes 121, 122 is adapted to execute said third application.

Said third computer program, when executed, receives said data stream, i.e. said sequence of said data sets, in said predetermined first data format and determines said data stream, i.e. said sequence of said data sets, in said predetermined second data format. For example said third computer program reads subsequent data sets from an input buffer of said first network node 121 or said second network node 122 in said predetermined first data format, determines said data sets in said predetermined second data format and stores subsequent data sets in said predetermined second data format in an output buffer of said first network node 121 or said second network node 122.

Alternatively or additionally said third computer program may be adapted to determine one or more of said data sets in said predetermined second data format depending on one or more of said data sets in said predetermined first data format.

Said server 110 or said first client 101 may be adapted to execute said third application, e.g. said third computer program as well. In this case said first client computer 101 or said server 110 comprise said input buffer and said output buffer.

Furthermore said first client computer 101 is adapted to send a request to receive said data stream in said predetermined second data format to said server 110. For example said first client 101 is adapted to send a first message, Request, to said server 110 using said Internet Protocol address of said server 110. Said first message is for example a Hyper Text Transport Protocol (HTTP) message GET including a request to receive said data stream mp4 format.

Furthermore said server 110 is adapted to receive said request, e.g. said first message, and for example upon receipt of said first message, select said third computer program from said predetermined computer programs, or a device at an endpoint of a section of said first data link from devices of said wide area computer network 100.

Said device is for example selected from a list of predetermined devices that was generated by an administrator of said wide area computer network 100 and is stored on said server 110 in a data base associated with the internet protocol address of the respective device.

Alternatively a broadcast message requesting available devices in said wide area computer network 100 and the corresponding reply of said devices may be used. In that case said devices and said server 110 are adapted to send and receive the appropriate messages.

Said device or said third compute program is for example selected based on monitoring of available devices and connections between said devices that are suitable to form a section of said first data link in said wide area computer network 100. For example rules for selecting said device or said third computer program are defined by an operator of said wide area computer network 100 and stored on said server 110 in a knowledge base. For example an expert system, i.e. a software that processes said rules and results of said monitoring, is used to select said device or said third computer program.

Methods for monitoring said wide area computer network 100 are well known to the person skilled in the art and not further explained here.

For example said data base additionally contains specifications of said predetermined devices of said wide area computer network 100 or said predetermined computer programs. Said specifications may be used to determine information about availability of said predetermined devices or predetermined computer programs and their respective capability.

Furthermore real-time status information of devices or connections suitable to be sections of said first data link in said wide area computer network 100 may be used. Said real-time status information is for example collected by network device management tools like the Alcatel-Lucent 5670 Reporting and Analysis Manager and send to said server 110 in report messages at predetermined points in time. Based on this information appropriate processing resources, i.e. devices in said wide area computer network 100, are selected for executing said third computer program.

Connections between devices suitable to form sections of said first data link, e.g. transport resources like said optical fibers, said wireless links or said copper wires including said electronic circuitry for operating them, may be taken into account when selecting said device or said third computer program to ensure that said sections of said first data link or said device can support the required exchange of data between said first computer program, said second computer program or said third computer program.

Said first data link is for example determined initially by said server 110 by looking up the first entry in a routing table describing available devices and connections between devices that are suitable to form sections of said first data link in said wide area computer network 100. Said routing table is for example stored on said server 110. Alternatively or additionally said connections suitable to form sections of said first data link may be selected initially using other methods like the well known Address Resolution Protocol (ARP). In this case information about said routing may be stored on any device in said wide area computer network.

Furthermore said first data link may be changed, e.g. by replacing devices or applications, e.g. computer programs, or by adding devices or applications that were not initially part of said first data link. Said first data link is for example changed in real-time at the time said applications or devices are set up initially, for example if not sufficient transport capacity is available on the initially selected data link.

Furthermore re-placement or introduction of new devices or applications, e.g. computer programs, into said first data link may be applied in real-time during transmission of said data, for example to react to changing utilization patterns of said devices, said sections of said first data link or said connections suitable to form sections of said first data link.

Said server 110 is adapted to select said third application, e.g. said third computer program, from said predetermined applications, e.g. said predetermined computer programs. Said third computer program is for example selected by said server 110 depending on information about said data or said wide area computer network 100. Information about said computer network is for example said computing cycles per second available on said devices for executing said third application, the bandwidth of said first data link or of said connections suitable to form sections of said data link, latency or cost.

Said cost is for example energy consumption cost, maintenance cost or lease cost of said predetermined devices or of said connections in said wide area computer network 100.

For example said server 110 is adapted to select said mp4 coder upon receipt of said request to receive said data stream as MPEG-4 video provided in an mp4 container according to ISO/IEC 14496-12 and -14, i.e. in said mp4 format.

Furthermore said server 110 is adapted to transfer said third application, e.g. said third computer program, to said device, e.g. using said Hyper Text Transport Protocol (HTTP). For example said server 110 sends a second message, PUT, including said third computer program.

Transfer of said third application, e.g. said third computer program, or transferring of said third application, e.g. said computer program, for example means any form of electronically sending said third application, e.g. said third computer program to said device. For example transferring means to send said machine code, said byte code or said assembler code to said device from its storage location in said wide area computer network 100.

Said predetermined devices are for example said server 110, said first client computer 101, said first network node 121 or said second network node 122.

Said predetermined devices may also include any other device that is part of said wide area computer network 100.

In order to signal the completion of the transfer of said third computer program to said device, said device may be adapted to send a third message, Response, to said server 110. Said third message is for example a Hyper Text Transport Protocol message 200 OK.

In this case said server 110 may be adapted to receive said third message and to send subsequent data sets of said data stream to said device using said predetermined first data format upon receipt of said third message. Said server 110 is for example adapted to send said data sets in said Digital Video format to said device upon receipt of said third message.

In order to signal the termination of the transmission of said data stream to said server 110, said first client computer 101 may be adapted to send a fourth message, Request, to said server 110. Said fourth message is for example a Hyper Text Transport Protocol (HTTP) message GET including a request to terminate the transmission of said data stream.

In this case said server 110 may be adapted to receive said fourth message and to stop sending subsequent data sets of said data stream to said device.

Furthermore said server 110 may be adapted to send a fifth message, Request, to said device, in particular upon receipt of said fourth message. Said fifth message is for example a Hyper Text Transport Protocol (HTTP) message DELETE, including a request to delete said third application, e.g. said third computer program, from said device.

In this case said device, in said first example said second network node 122, may be adapted to receive said fifth message and to delete said third application, e.g. said third computer program from its storage. This way the storage capacity on said device is only used as long as said third application is required to transmit said data stream. Optionally said device may be adapted to delete said third application if a timeout condition is met. For example said application is deleted by said device from said device after 1 minute of inactivity of said third application.

Furthermore to enhance security, additional messages may be used for authentication. For example asymmetric encryption using pairs of private and public keys according to the Hyper Text Transfer Protocol Secure (HTTPS) may be used.

Furthermore to enhance robustness, additional messages may be used for signaling of status. For example Hyper Text Transfer Protocol (HTTP) status messages may be used.

Additionally said server 110 may be adapted to determine whether a predetermined condition is fulfilled and to transfer said third computer program to said device if said predetermined condition is fulfilled.

Said predetermined condition is for example the comparison of a status of said wide area computer network 100 to a predetermined threshold.

For example the number of currently available computing cycles per second of said devices in said first data link between said server 110 and said first client computer 101 is monitored and in real-time compared to said predetermined threshold, e.g. of 10 Million Instructions per Second (MIPS).

Said predetermined condition is in this case fulfilled, if said number of currently available computing cycles per second drops below said predetermined threshold.

Said predetermined condition may also consider any other characteristic like latency, cost or transmission bandwidth of said wide area computer network 100 and corresponding other types of thresholds.

Furthermore said device, e.g. said server 110, said first client computer 101, said first network node 121 or said second network node 122, is adapted to receive said third computer program, to start execution of said computer program upon completion of the transfer of said computer program to said device, and to process said data.

This means for example that said device, e.g. said server 110, said first client computer 101, said first network node 121 or said second network node 122 are adapted to receive said data sets in said predetermined first data format and send said data sets in said predetermined second data format, by executing said third computer program.

Figure 2:
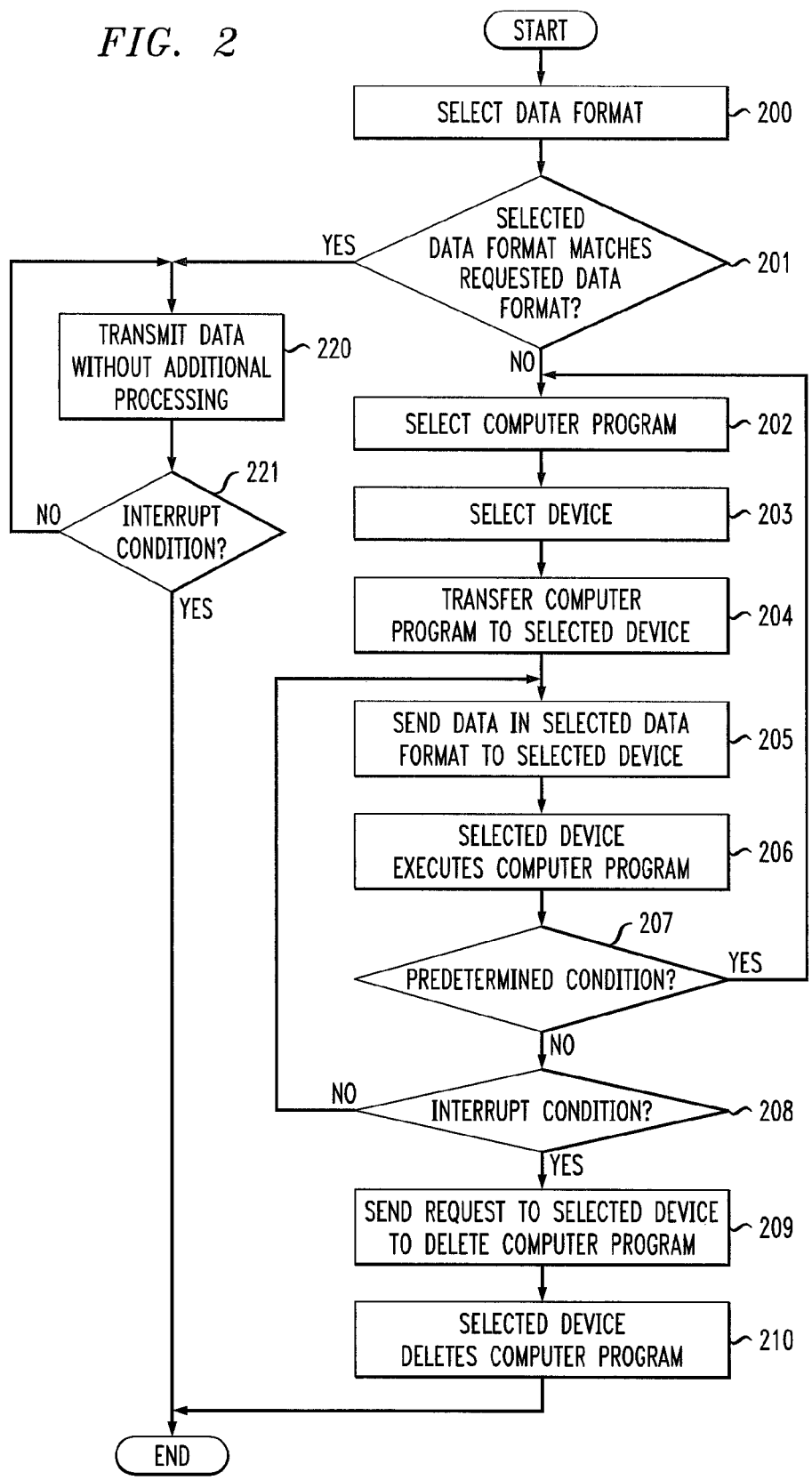
FIG. 2 schematically shows a flow chart, showing some typical steps according to a first method.

A first method for transmitting said data via said first data link in said wide area computer network 100 is described below making reference to the flow chart depicted in FIG. 2.

In said first method said third application, e.g. said third computer program, and said device on which said third application, e.g. said third computer program, can be deployed and executed in order to provide the suited transformation between said first data format and said second data format is selected and transferred to said device.

In said first method said mp4 coder is introduced in said first data link on said second network node 122 to provide said data stream in the format that said first client computer 101 accepts.

Alternatively said mp4 coder may be introduced in said first data link to reduce required transport bandwidth on a section of said first data link before sending said data stream or during runtime of the transmission of said data stream.

Said first method starts, when said first message requesting to receive said data stream in said predetermined second data format is received by said server 110. Said first message for example contains said request to receive said data stream in said MPEG-4 video provided in said mp4 format.

Afterwards a step 200 is executed.

In said step 200, said predetermined first data format for transmitting said data via said section of said wide area computer network 100 is selected, in particular by said server 110, from predetermined data formats. Said predetermined first data format is for example selected depending on information about said data or said wide area computer network 100, in particular said available computing cycles per second on said device, bandwidth of said first data link, bandwidth of said connections suitable to form part of said first data link, latency or cost. For example said Digital Video format is selected as said predetermined first data format because said server 110 comprises an Application Specific Integrated Circuit (ASIC) for providing said Digital Video format. Afterwards a step 201 is executed.

In said step 201 a test is performed to determine whether said predetermined first data format and said predetermined second data format match. In case as said predetermined first data format and said predetermined second data format match a step 220 is executed. Otherwise a step 202 is executed.

In said step 220 the data formats match. Therefore no additional processing is required. In this case said first application, e.g. said first computer program, determines said data set of said data stream in said predetermined first data format and sends it to said first client computer 101 via said first network node 121 or said second network node 122 using said Transmission Control Protocol/Internet Protocol (TCP/IP) or said User Datagram Protocol (UDP). Afterwards a step 221 is executed.

In said step 221, an interrupt condition is determined. In case said interrupt condition is not met, said step 220 is executed to continue transmitting said data stream. Otherwise said first method ends. Said first method ends for example any time a disconnection request from said recipient, e.g. said first client computer 101 is received by said server 110. Said disconnection request is for example said fourth message.

In said step 202, said third application adapted to process said data, e.g. said third computer program, is selected from said predetermined applications, e.g. said predetermined computer programs depending on said data or said information about said wide area computer network 100. Said third computer program is for example selected by said server 110 depending on said information about said data or said wide area computer network 100. For example said mp4 coder is selected because it can determine said predetermined second data format, e.g. said mp4 format, from input in said predetermined first data format, e.g. Digital Video format. Afterwards a step 203 is executed.

In said step 203, said device at said endpoint of said section of said first data link is selected from predetermined devices of said wide area computer network 100 depending on said information about said data or said wide area computer network 100. Said predetermined devices of said wide area computer network 100 are for example said server 110, said first client computer 101, said first network node 121 or said second network node 122. For example said second network node 122 is selected as said device, because the number of computing cycles per second available on said second network node 122 is sufficient for executing said third application, and the bandwidth of connection between said server 110 and said second network node 122 is suitable to form said section of said first data link, e.g. is sufficient for transmitting said data sets in said Digital Video format. Afterwards a step 204 is executed.

In said step 204, said third computer program is transferred to said device, e.g. said server 110, said first client computer 101, said first network node 121 or said second network node 122. For example said third computer program is transferred to said second network node 122, in particular from said storage in said server 110 or a storage that is connected to said wide area computer network 100. Said transfer is for example done using said second message, e.g. said Hyper Text Transport Protocol message PUT. Furthermore execution of said computer program is started on said device, in particular upon completion of said transfer. Afterwards a step 205 is executed.

In said step 205, said first application, e.g. said first computer program, determines said data set of said data stream in said predetermined first data format, e.g. said Digital Video format, and sends it to said second network node 122. For example a single picture (frame) is captured by said digital video camera and processed by said Application Specific Integrated Circuit (ASIC) into said Digital Video format. Afterwards a step 206 is executed.

In said step 206 said data is processed by said device by executing said third application, e.g. said third computer program. Processing said data for example means to receive said data sets in said first data format, to determine said data sets in said second data format and to send said data sets in said second data format to said first client computer 101. For example said data is sent in said second data format by executing said third computer program on said device e.g. said second network node 122. Afterwards a step 207 is executed.

In said step 207, said predetermined condition is determined. In case said predetermined condition is not fulfilled, a step 208 is executed. Otherwise, i.e. if said predetermined condition is fulfilled, said step 202 is executed. Said predetermined condition is for example fulfilled, if said number of currently available computing cycles per second on said device drops below said predetermined threshold, e.g. of 10 Million Instructions per Second (MIPS).

In said step 208, an interrupt condition is determined. In case said interrupt condition is not met, said step 205 is executed to continue transmitting said data stream. Otherwise an optional step 209 is executed. Said interrupt condition is for example a disconnection request from said recipient, e.g. said first client computer 101 that is received by said server 110. Said disconnection request is for example said fourth message, e.g. said Hyper Text Transfer Protocol message GET, indicating the request to terminate transmission of said data.

In said optional step 209 said server 110 sends said request to delete said third application, e.g. said third computer program, to said device. For example said server 110 sends said fifth message, e.g. said Hyper Text Transfer Protocol message DELETE, indicating the request to delete said third application to said device. Afterwards an optional step 210 is executed.

In said optional step 210, said third application, e.g. said third computer program, is deleted from said device, e.g. by said device upon receipt of said fifth message. Afterwards said first method ends.

Additionally before said data stream starts, messages to set up said device, said recipient e.g. said first client computer 101, or said source, e.g. said server 110, or any other network node of said wide area computer network 100 may be sent. For example Hyper Text Transport Protocol messages may be sent to set up said first application, said second application, said third application or the respective computer programs with the appropriate parameters.

In a modification of said first method, while sending said data sets in said steps 220 or 205, said wide area computer network 100 is monitored, e.g. by said server 110, to gather said information about said wide area computer network 100.

From said information about said data or said wide area computer network 100 said predetermined condition is determined by said server 110. For example the number of currently available computing cycles per second of devices in said first data link between said server 110 and said first client computer 101 is monitored and in real-time compared to said predetermined threshold, e.g. of 10 Million Instructions per Second (MIPS).

In this case, if said available computing cycles per second of on of said devices drops below said predetermined threshold, said predetermined condition is fulfilled and said step 202 is executed.

This way said third computer program is transferred to the most suitable device within said wide area computer network 100 while at the same time sending of said data stream continues.

This means that the data flow of said data stream is managed in real time by adapting said first data link to changes in said wide area computer network 100.

In said first example, quality loss (less resolution or frame drops) may be acceptable but the video must be delivered. In order to do so, said server 110 will determine what alternative data formats are suitable for delivery at the recipient. Based on said information about said wide area computer network 100 collected by monitoring, said third computer program is adapted in a way to meet requirements or not exceed limitations of said predetermined devices or sections of said first data link.

In said first example, said data stream may be sent to said first client computer 101 in said second data format, e.g. said mp4 format, because said first client computer 101 requested said data stream in said second data format. This means that in said first example, said mp4 coder may be placed on any network node in said wide area computer network 100 or on said server 110.

In said first example, computing cycles per second available on said server 110 was limited and hence said second network node 122 was selected as said device. Optionally, in case said server 110 has the appropriate processing unit, to reduce bandwidth consumption in the entire first data link said mp4 coder may be executed on said server 110 instead, by selecting said server 110 as said device.

Figure 3:
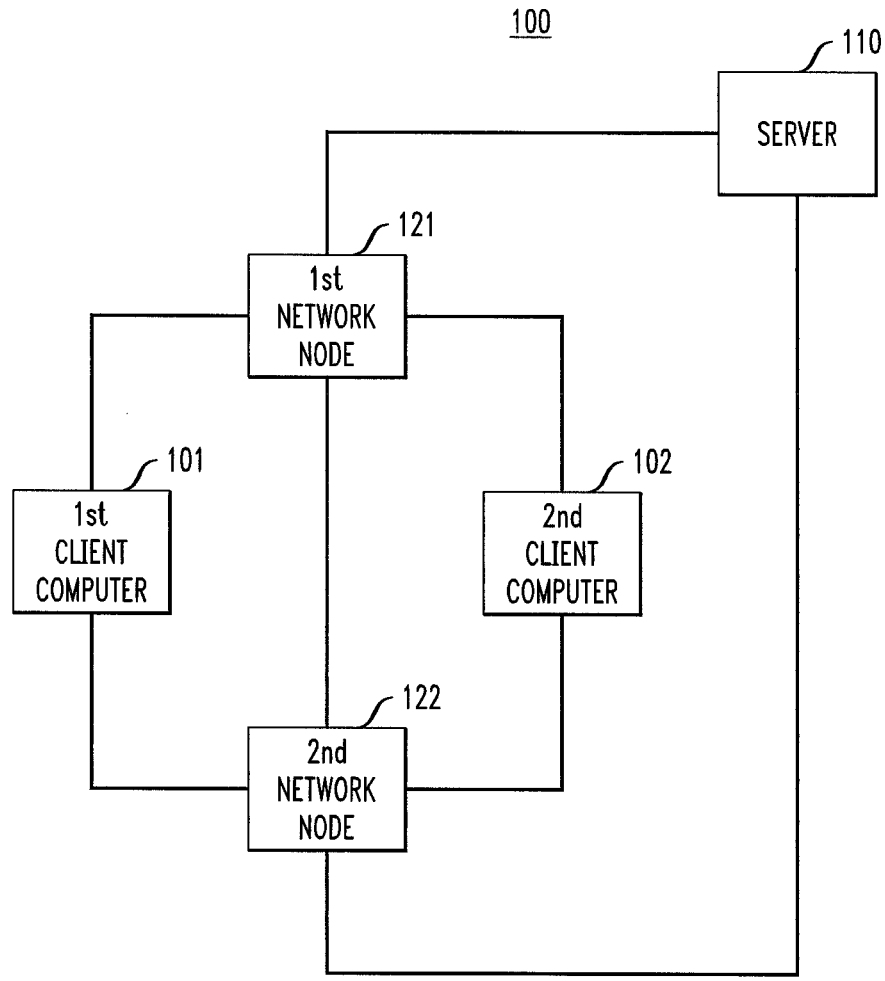
FIG. 3 schematically shows a second part of a computer network.

A second example using said single source, e.g. said server 110 and two receivers e.g. said first client computer 101 and a second client computer 102, is described below referencing FIG. 3. FIG. 3 shows a second part of said wide area computer network 100.

Said second client computer 102 has for example features corresponding to the features of said first client computer 101 as described above.

Additionally said server 110 to receive and process messages corresponding to the messages that are received from said first client computer 101 from said second client computer 102.

Additionally said server 110 to determine and send messages corresponding to the messages that are send to said first client computer 101 to said second client computer 102.

Said second part of said wide area computer network 100 comprises said first part of said wide area computer network 100 as described in said first example, and additionally said second client computer 102.

Said second client computer 102 and said server 110 are connected via a second data link. Said second data link comprises of sections. Endpoints of said sections are devices, e.g. said server 110, said second client computer 102, said first network node 121 or said second network node 122. Said sections of said second data link are connections between said devices, for example said optical fibres, said wireless links or said copper wires including the respective electronic circuitry for operating them. Said data is transmitted via said second data link using said transmission protocols, e.g. the well known Transmission Control Protocol/Internet Protocol (TCP/IP). Any other type of wired or wireless data links, e.g. according to the User Datagram Protocol (UDP), the Ethernet or IEEE 802.11 standard, may be used as well.

Optionally said first client computer 101 and said second client computer 102 may be connected to each other directly as well.

Said first network node 121, said second network node 122, said server 110, said first client computer 101 or said second client computer 102 may be connected to each other directly or indirectly.

According to said second example, said first client computer 101 requests said data stream in said second data format, e.g. said mp4 format and said second client computer requests said data stream in said first data format, e.g. said Digital Video format.

Instead of said server 110 sending two different data streams (one in each of the requested format), said data stream may be sent from said server 110 to said device in one of the data formats requested and send from said device in two data streams (one in each of the requested formats).

To this end, said server 110 is adapted to select from said predetermined devices the device that is located optimally in said wide area computer network 100, for processing said third computer program and for start sending two data streams.

To distinguish the recipients, said header of said data sets may comprise additional information identifying more than one recipient, e.g. contain internet protocol addresses of said first client computer 101 and said second client computer 102, and information about the data format to use for data sets sent to each of said recipients.

Said predetermined devices have the same features as described in said first example. Furthermore some or all of said predetermined devices may comprise a first output buffer for storing said a first data set in said first data format and a second data set in said second data format.

Said server 110 is for example adapted to use a cost function considering said information about said data or said wide area computer network 100, e.g. computing cycles per second available on said devices, transmission bandwidth available on said connections suitable to form sections of said first data link or said second data link, latency or cost may be used to select said device from said predetermined devices that is optimal for processing said third application or said third computer program, e.g. said mp4 coder.

Said predetermined applications, e.g. said predetermined computer programs according to said second example have the same features as described in said first example. Additionally one or more of said predetermined applications or predetermined computer programs may be adapted to only forward said data sets to more than on recipient, e.g. said first client computer 101 and said second client computer 102.

Additionally some or all of said predetermined applications, e.g. said predetermined computer programs, are adapted to process said header to identify said more than one recipient. Additionally some or all of said predetermined, e.g. said predetermined computer programs, are adapted to process said header to identify said information about the data format to use for data sets sent to each of said recipients, and to send said data sets to the respective recipient using the respective data format.

Figure 4:
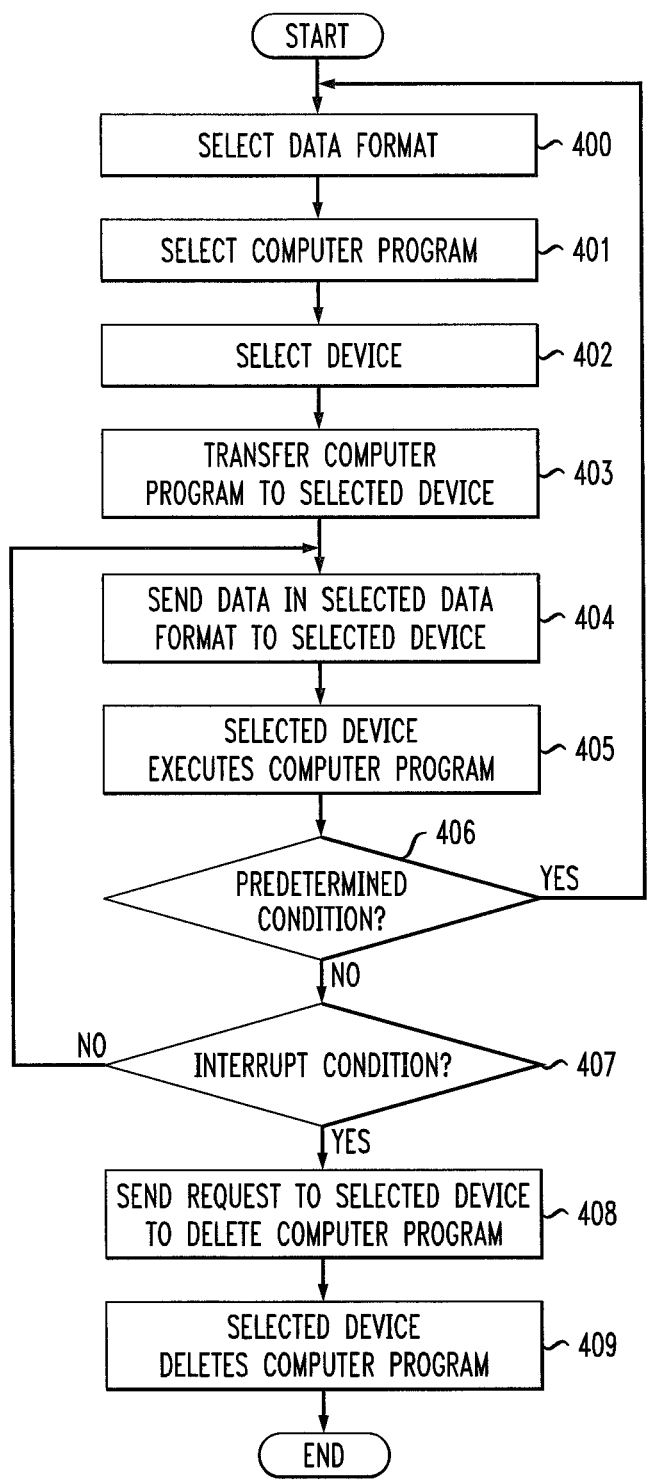
FIG. 4 schematically shows a flow chart, showing some typical steps according to a second method.

A second method for transmitting said data is described below making reference to FIG. 4.

Said second method starts for example in case said first message, requesting said data stream in said predetermined first data format, e.g. mp4 format, is received by said server 110 from said first client computer 101, while said server 110 already sends data sets of said data stream in said predetermined second data format, e.g. Digital Video format, to said second client computer 102.

After the start a step 400 is executed.

In said step 400, a predetermined third data format most suitable for transmitting said data via said section of said wide area computer network 100 to said device is selected, in particular by said server 110, from said predetermined data formats. Said predetermined third data format is for example selected depending on information about said data or said wide area computer network 100, in particular available computing cycles per second, bandwidth of said first data link, bandwidth of said connections suitable to form part of said first data link, latency or cost. For example said Digital Video format is selected as said predetermined third data format because said server 110 comprises an Application Specific Integrated Circuit (ASIC) for providing said Digital Video format. Afterwards a step 401 is executed.

In said step 401, said third application adapted to process said data, e.g. said third computer program, is selected from said predetermined applications, e.g. said predetermined computer programs depending on said data or said information about said wide area computer network 100. Said third computer program is for example selected by said server 110 depending on said information about said data or said wide area computer network 100. For example said mp4 coder is selected because it can forward said data sets in said second data format, e.g. said Digital Video format, and determine said data sets in said predetermined second data format, e.g. said mp4 format, from input in said predetermined third data format, e.g. Digital Video format. Afterwards a step 402 is executed.

In said step 402, said device at said endpoint of said section of said first data link is selected from predetermined devices of said wide area computer network 100 depending on said information about said data or said wide area computer network 100. Said predetermined devices of said wide area computer network 100 are for example said server 110, said first client computer 101, said first network node 121 or said second network node 122. For example said second network node 122 is selected as said device, because the number of computing cycles per second available on said second network node 122 is sufficient for executing said third application, and the bandwidth of the connection between said server 110 and said second network node 122 is suitable for transmitting said data sets in said third data format, e.g. said Digital Video format. Afterwards a step 403 is executed.

In said step 403, said third computer program is transferred to said device, e.g. as described in step 204 of said first method Afterwards a step 404 is executed.

In said step 404, said first application, e.g. said first computer program, determines said data set of said data stream in said predetermined third data format, e.g. said Digital Video format, and sends it to said second network node 122. For example a single picture (frame) is captured by said digital video camera and processed by said Application Specific Integrated Circuit (ASIC) into said Digital Video format. Afterwards a step 405 is executed.

In said step 405 said data is processed by said device by executing said third application, e.g. said third computer program. Processing said data for example means to receive said data sets in said third data format, to analyze said header to determine which data format to use for which recipient, to determine said data sets in said first data format and said second data format, and to send said data sets to said first client computer 101 in said second data format and to said second client computer 102 in said first data format. Afterwards a step 406 is executed.

In said step 406, said predetermined condition is determined. In case said predetermined condition is not fulfilled, a step 407 is executed. Otherwise, i.e. if said predetermined condition is fulfilled, said step 400 is executed. Said predetermined condition is for example fulfilled, if said number of computing cycles per second available on said device drops below said predetermined threshold, e.g. of 10 Million Instructions per Second (MIPS).

In said step 407, an interrupt condition is determined. In case said interrupt condition is not met, said step 404 is executed to continue transmitting said data stream. Otherwise an optional step 408 is executed. Said interrupt condition is for example a disconnection request from one of said recipient, e.g. said first client computer 101 or said second client computer 102 that is received by said server 110. Said disconnection request is for example said fourth message, e.g. said Hyper Text Transfer Protocol message GET, indicating the request to terminate transmission of said data.

In said optional step 408 said server 110 sends said request to delete said third application, e.g. said third computer program, to said device. For example said server 110 sends said fifth message, e.g. said Hyper Text Transfer Protocol message DELETE, indicating the request to delete said third application to said device. Afterwards an optional step 409 is executed.

In said optional step 409, said third application, e.g. said third computer program, is deleted from said device, e.g. by said device upon receipt of said fifth message. Afterwards said second method ends.

In case multiple servers or multiple recipients of said data stream are used, said methods are applied likewise for individual devices, data links and data formats.

Said third application may be executed on any network node or at said one or multiple sources or said one or multiple receivers adapted to execute said third application.

Said third application may be used in case that said data formats used at said one or multiple sources and said one or multiple receivers are different or to perform efficient data-distribution.

In the case that different recipients request different data formats, for conversion towards the requested data formats any required number of third applications can be executed at any of said network nodes or one or multiple sources or one or multiple receivers.

Alternatively a separate server within said wide area computer network may be used to select said third application, e.g. said third computer program or said device.

Alternatively said first computer program or said second computer program may be selected as well, depending on said data or said information about said wide area computer network.

The aforementioned methods may be combined to further increase flexibility of said management of said data flow.

Said methods may be implemented as a computer program or may be stored as a computer program on a computer readable medium.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as 'processors', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for transmitting data via a data link in a computer network, comprising:
    receiving a request for transmission of select data in a select format from a client computer at a server in a computer network, wherein the computer network is formed by a plurality of interconnected network devices that include the client computer and the server;
    selecting an initial format for the select data from one or more predetermined data formats;
    selecting a computer program from one or more predetermined computer programs such that the selected computer program is configured to transform the select data from the initial format to the select format;
    selecting a transformation device from the plurality of network devices for transformation of the select data from the initial format to the select format;
    transferring the computer program to said transformation device, wherein the transformation device is configured to execute said computer program after completion of the transferring for subsequent transformation of the select data from the initial format to the select format;
    sending the select data from a source to the transformation device in the initial format;
    transforming the select data from the initial format to the select format by executing the computer program at the transformation device to process the select data; and
    transmitting the select data from the transformation device to the client computer in the select format to fulfill the request from the client computer.

2. The method according to claim 1, wherein the initial format is selected by the server from the one or more predetermined data formats based on at least one of bandwidth, latency, and cost information about said computer network.

3. The method according to claim 1, wherein said computer program is selected from the one or more predetermined computer programs by the server based on at least one of bandwidth, latency, and cost information about said computer network.

4. The method according to claim 1, wherein said transformation device is selected from the plurality of interconnected network devices by the server based on at least one of bandwidth, latency, and cost information about said computer network.

5. The method according to claim 1, further comprising:
    determining a predetermined condition is fulfilled in conjunction with transferring the computer program to said transformation device.

6. The method according to claim 1, wherein at least one of said transformation device and said computer program are selected based on information about said select data.

7. A server, comprising:
at least one processor and associated memory for transmitting data via a data link in a computer;
wherein the at least one processor is configured to receive a request for transmission of select data in a select format from a client computer in a computer network, wherein the computer network is formed by a plurality of interconnected network devices that include the client computer and the server;
wherein the at least one processor is configured to select an initial format for the select data from one or more predetermined data formats;
wherein the at least one processor is configured to select a computer program from one or more predetermined computer programs such that the selected computer program is configured to transform the select data from the initial format to the select format;
wherein the at least one processor is configured to select a transformation device from the plurality of network devices for transformation of the select data from the initial format to the select format;
wherein the at least one processor is configured to transfer the computer program to said transformation device, wherein the transformation device is configured to execute the computer program after completion of the transfer for subsequent transformation of the select data from the initial format to the select format;
wherein the at least one processor is configured to send the select data from a source to the transformation device in the select format;
wherein the transformation device is configured to transform the select data from the initial format to the select format by executing the computer program at the transformation device to process the select data;
wherein the transformation device is configured to transmit the select data to the client computer in the select format to fulfill the request from the client computer.

8. The server according to claim 7, wherein said server is configured to determine a predetermined condition is fulfilled in conjunction with transferring said computer program to said transformation device.

9. A non-transitory computer-readable medium storing program instructions that, when executed by a computer, cause a corresponding computer-controlled server to perform a method for transmitting data via a data link in a computer network, the method comprising:
selecting an initial format for select data from one or more predetermined data formats in response to receiving a request for transmission of the select data in a select format from a client computer at the server in the computer network, wherein the computer network is formed by a plurality of interconnected network devices that include the client computer and the server;
selecting a computer program from one or more predetermined computer programs such that the selected computer program is configured to transform the select data from the initial format to the select format;
selecting a transformation device from the plurality of network devices for transformation of the select data from the initial format to the select format;
transferring the computer program to said transformation device, wherein the transformation device is configured to execute said computer program after completion of the transferring for subsequent transformation of the select data from the initial format to the select format; and
sending the select data from a source to the transformation device in the initial format;
wherein the transformation device is configured to transform the select data from the initial format to the select format by executing the computer program to process the select data;
wherein the transformation device is configured to transmit the select data to the client computer in the select format to fulfill the request from the client computer.

10. The method according to claim 1, wherein the plurality of interconnected network devices includes one or more network nodes interconnecting the server with the client computer;
wherein the server selects itself, a select network node of the one or more network nodes, or the client computer as the transformation device based on at least one of bandwidth, latency, and cost information about said computer network.

11. The method according to claim 1, further comprising:
receiving a second request for transmission of the select data in a second select format from a second client computer at the server, wherein the plurality of interconnected network devices forming the computer network includes the second client computer;
selecting the transformation device for transformation of the select data from the initial format to the second select format, wherein the computer program is configured to transform the select data from the initial format to the second select format;
transforming the select data from the initial format to the second select format by executing the computer program at the transformation device to process the select data; and
transmitting the select data from the transformation device to the second client computer in the second select format to fulfill the second request from the second client computer.

12. The method according to claim 1, further comprising:
receiving a second request for transmission of the select data in the initial format from a second client computer at the server, wherein the plurality of interconnected network devices forming the computer network includes the second client computer; and
transmitting the select data from the transformation device to the second client computer in the initial format to fulfill the second request from the second client computer.

13. The server according to claim 7, wherein the at least one processor is configured to select the initial format from the one or more predetermined data formats based on at least one of bandwidth, latency, and cost information about said computer network.

14. The server according to claim 7, wherein the at least one processor is configured to select the computer program from the one or more predetermined computer programs based on at least one of bandwidth, latency, and cost information about the computer network.

15. The server according to claim 7, wherein the at least one processor is configured to select the transformation device from the plurality of interconnected network devices based on at least one of bandwidth, latency, and cost information about said computer network.

16. The server according to claim 7, wherein the at least one processor is configured to select at least one of the transformation device and the computer program based on information about the select data.

17. The server according to claim 7, wherein the at least one processor is configured to receive a second request for transmission of the select data in a second select format from a second client computer, wherein the plurality of interconnected network devices forming the computer network includes the second client computer;
  wherein the at least one processor is configured to select the transformation device for transformation of the select data from the initial format to the second select format, wherein the computer program is configured to transform the select data from the initial format to the second select format;
  wherein the transformation device is configured to transform the select data from the initial format to the second select format by executing the computer program to process the select data;
  wherein the transformation device is configured to transmit the select data to the second client computer in the second select format to fulfill the second request from the second client computer.

18. The server according to claim 7, wherein the at least one processor is configured to receive a second request for transmission of the select data in the initial format from a second client computer, wherein the plurality of interconnected network devices forming the computer network includes the second client computer;
  wherein the transformation device is configured to transmit the select data to the second client computer in the initial format to fulfill the second request from the second client computer.

19. The method according to claim 1, wherein the computer program is deleted from the transformation device after the select data is transmitted from the transformation device to the client computer in the select format.

20. The server according to claim 7, wherein the plurality of interconnected network devices includes one or more network nodes interconnecting the server with the client computer;
  wherein the at least one processor is configured to select the server, a select network node of the one or more network nodes, or the client computer as the transformation device based on at least one of bandwidth, latency, and cost information about said computer network.

* * * * *